(12) United States Patent
McCoy

(10) Patent No.: US 10,259,647 B2
(45) Date of Patent: Apr. 16, 2019

(54) FILL DEVICE FOR A WATER RESERVOIR TANK

(71) Applicant: Christopher W. McCoy, Piedmont, SC (US)

(72) Inventor: Christopher W. McCoy, Piedmont, SC (US)

(73) Assignee: McLaughlin Group, Inc., Greenville, SC (US)

(*) Notice: Subject to any disclaimer, the term of this patent is extended or adjusted under 35 U.S.C. 154(b) by 0 days.

(21) Appl. No.: 15/018,655

(22) Filed: Feb. 8, 2016

(65) Prior Publication Data
US 2017/0225884 A1   Aug. 10, 2017

(51) Int. Cl.
*B60P 3/00* (2006.01)
*B65D 88/54* (2006.01)
*F16K 15/04* (2006.01)
*B65D 88/12* (2006.01)
*F16K 31/22* (2006.01)
*E21B 7/18* (2006.01)

(52) U.S. Cl.
CPC ............ *B65D 88/54* (2013.01); *B65D 88/12* (2013.01); *F16K 15/044* (2013.01); *F16K 31/22* (2013.01); *E21B 7/18* (2013.01)

(58) Field of Classification Search
CPC ....... B65D 88/54; B65D 88/12; F16K 15/044; E21B 7/18
USPC ............ 220/562–567, 567.1, 567.2, 567.3, 220/581–592; 137/511, 515, 601.2; 251/82
See application file for complete search history.

(56) References Cited

U.S. PATENT DOCUMENTS

| | | | | |
|---|---|---|---|---|
| 6,470,605 | B1* | 10/2002 | Gilman | E02F 3/8816 37/323 |
| 8,667,717 | B2* | 3/2014 | Maybury, Jr. | E02F 3/8816 37/323 |
| 9,382,688 | B2* | 7/2016 | Buckner | E02F 3/8891 |
| 9,399,853 | B2* | 7/2016 | Maybury | E02F 3/8816 |
| 9,687,890 | B2* | 6/2017 | Tacke | E01H 1/0836 |
| 9,816,250 | B2* | 11/2017 | Maybury | E02F 5/003 |
| 2008/0083143 | A1* | 4/2008 | Maybury | E02F 3/8816 37/317 |
| 2008/0085163 | A1* | 4/2008 | Maybury | E02F 3/8816 406/152 |
| 2008/0244859 | A1* | 10/2008 | Maybury | E02F 3/8816 15/340.2 |

* cited by examiner

*Primary Examiner* — Kareen K Thomas
(74) *Attorney, Agent, or Firm* — Nelson Mullins Riley & Scarborough LLP

(57) ABSTRACT

A fill device for use with a water reservoir tank in an earth reduction system, the fill device comprising a ring having a top surface and a bottom surface, a pipe having a first end connected to the top surface of the ring and a second end for connection to a water supply, a skirt affixed to the bottom surface of the center ring, an opening surrounded by a plate and defining a tortuous path and positioned below the first end of the pipe and the skirt, and a check valve support with a check valve mounted below the opening and the plate.

29 Claims, 7 Drawing Sheets

FILL DEVICE FOR A WATER RESERVOIR TANK

FIELD OF THE INVENTION

The invention relates generally to a reduction system for soil removal to expose underground utilities, and more particularly to a fill device for a water reservoir tank for use in such a system.

BACKGROUND OF THE INVENTION

With the increased use of underground utilities, there is a need to locate and verify the placement of buried utilities before installation of additional underground utilities or before other excavation or digging work is performed. Reduction systems are among the prior art systems that are used for removing soil to expose underground utilities such as electrical and cable services, water and sewage services, etc. A prior art vacuum operated earth reduction system typically comprises a mobile chassis, a central collection tank under vacuum mounted to the chassis, a water pump mounted to the chassis, a vacuum pump connected to the collection tank, at least one backfill reservoir for carrying backfill mounted on the chassis, and a water reservoir tank. The water reservoir tank contains clean water.

The water reservoir tank for the clean water has a hole or an opening with a screw cap with a threaded connection at the top of the tank. A user climbs a ladder to the top of the tank and unscrews the cap. If there is no pipe connection for the hose/water source (described below), the user holds the hose end above the tank opening and allows the water to flow into the tank while holding the hose. The user does not, however, attach the hose end into the tank opening. Instead, there is a gap between the end of the hose and the tank opening. The other end of the hose is connected to a clean water source such as a spigot or a fire hydrant.

The gap accommodates government regulations that require that a water source connected to a public water system not be connected in a pressure-sealed manner directly to the tank because of the risk that back pressure could allow a path for contents of the tank to flow back into the public system. If the water source is so connected to a closed volume, there is an increased possibility of high pressure in the enclosed volume, causing reverse flow back into a public water line and resulting in possible contamination to the public water supply, for example. Thus, where the hose is connected at the back end directly to the municipal water source, which provides pressure to the hose and at the nozzle at the hose's forward end, the hose is not attached at a sealed connection to the closed tank.

It is also known to provide a pipe at the side of the tank that extends from a position near the lower part of the tank/chassis, accessible to a user standing at ground level, up to the top of the tank. A hose extending from a municipal water source is attached in a sealed manner to this lower end of the pipe. The pipe then extends up the tank's side to the top of the tank and ends at a point offset from the capped hole in the top of the tank, leaving a gap between the end of the pipe and the cap. The gap allows the user, having climbed to the top of the tank via a ladder, to access and remove the cap and allows for a gap during water flow to prevent back pressure. The gap, however, can allow contaminants to enter the tank through the open gap when the tank is being filled. Further, while the pipe relieves the user of the need to haul the hose up to the tope of the tank, the user must nonetheless climb the tank to remove the cap. Generally, the hole/cap are disposed at the top in these systems because the water tank is not pressurized and water fills in the tank by downward flow.

Thus, there is a need for a device for filling a water reservoir tank in an earth reduction system that overcomes these known disadvantages and that does not require an individual to climb to the top of the tank every time the tank needs to be filled and, in certain embodiments, inhibits the escape of water from inside the tank and the entrance of contaminants into the tank.

SUMMARY OF THE INVENTION

The present invention recognizes and addresses disadvantages of the prior art constructions and methods, and it is an object of one or more embodiments of the present invention to provide a fill device for use in a water reservoir tank of a reduction system for soil removal that allows the water to be filled without backflow, shields a tank inlet from debris, and/or includes an obstruction element that allows water filling but restricts sloshing out of fill spout or tank opening once tank is full.

In an embodiment, a fill device and water reservoir tank in an earth reduction system has a water tank having an opening at an upper surface thereof and defining an interior volume. A pipe has a first end offset from the opening and a second end for connection to a water supply. A skirt affixed to the second end of the pipe extends downward therefrom toward the opening and has a periphery that surrounds the opening and that defines a gap between the first end and the opening that precludes backpressure in the pipe when water flows from the pipe, through the skirt and the opening, and into the water tank interior volume. A check valve is mounted within the tank interior volume adjacent the opening so that water flow from the interior volume of the tank toward the opening biases the check valve in a closed position with respect to the opening.

In an embodiment, the fill device comprises a ring having a top surface and a bottom surface. A pipe has a first end connected to the top surface of the ring and a second end for connection to a water supply. A skirt is affixed to the bottom surface of the ring and extends downward therefrom, away from the first end, and the skirt encompasses an internal area. An opening is surrounded by a plate that defines, in conjunction with the skirt, a tortuous path between the opening and an area external to the skirt with respect to the internal area, the plate being positioned below the first end of the pipe and the skirt. A check valve support has a check valve mounted below the opening and the plate.

In an embodiment, the fill device is mounted to a water reservoir tank in the earth reduction system.

In another embodiment of the present invention, the check valve is a ball check valve.

In yet another embodiment of the present invention, the check valve is a spring loaded check valve biased to a closed position. The bias is calibrated such that the pressure of the water coming down from the pipe opens the valve, thereby allowing the water to go into the tank, but such that the bias would nonetheless be strong enough to keep debris out of the tank.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

A full and enabling disclosure of the present invention, including the best mode thereof directed to one of ordinary skill in the art, is set forth in the specification, which makes reference to the appended figures, in which.

Figure 1:
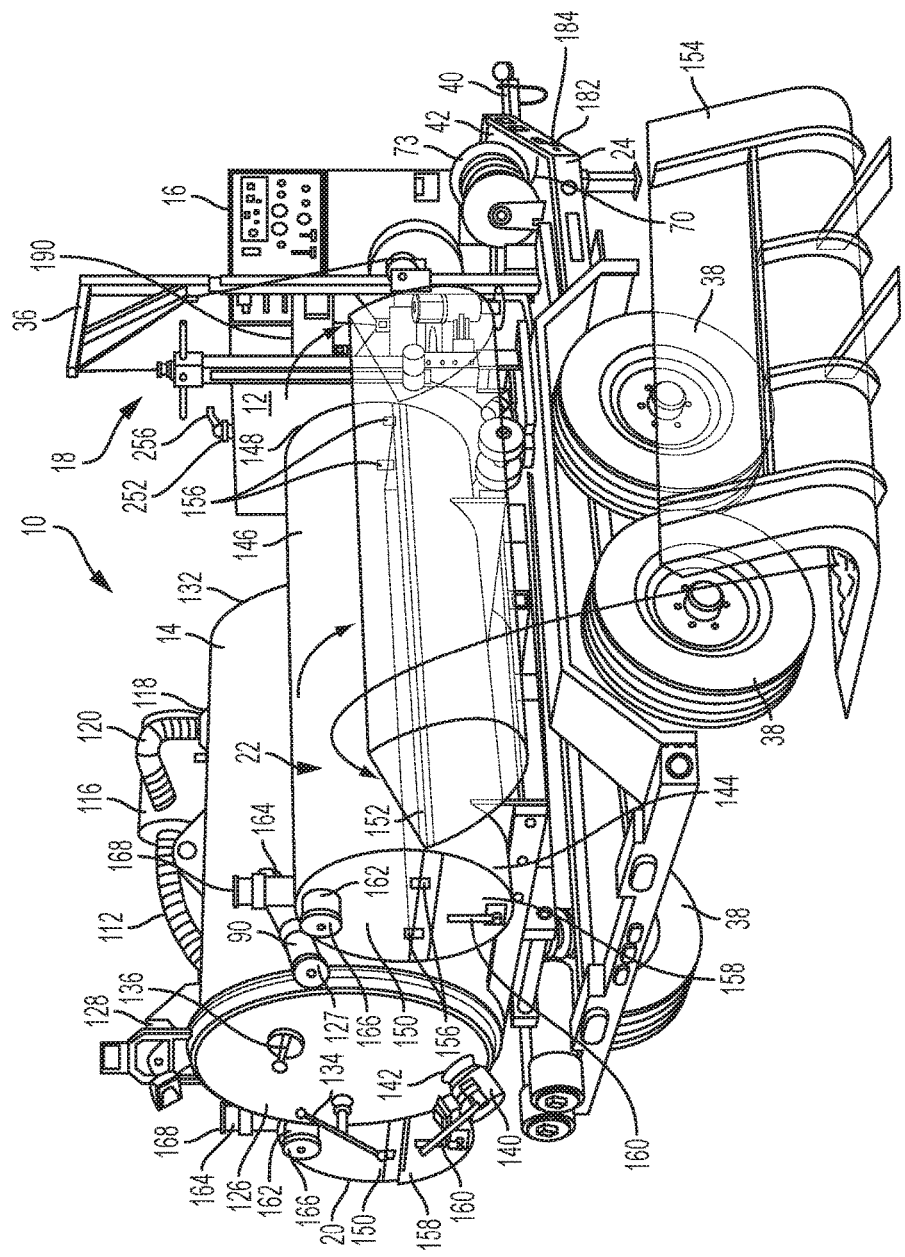
FIG. 1 is a perspective view of a prior art vacuum and backfill earth reduction system.

Repeat use of reference characters in the present specification and drawings is intended to represent same or analogous features or elements of the invention.

DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the trailer, such as but not limited to "vertical," "horizontal," "upper," "lower," "above," or "below," refer to directions and relative positions with respect to the earth reduction system's orientation (and that of the water tank there included) in its normal intended operation, for example as indicated in FIGS. 1 and 3-7. Thus, for instance, the terms "vertical" and "upper" refer to the vertical orientation and relative upper position in the perspective of FIGS. 1 and 3-7 and should be understood in that context, even with respect to an earth reduction system and tank that may be disposed in a different orientation. The term "parallel" encompasses offset from and parallel to, as well as coincident with.

Further, the term "or" as used in this application and the appended claims is intended to mean an inclusive "or" rather than exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "and" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "and," and "b" may include plural references, and the meaning of "in" may include "in" and "on." The phrase "in one embodiment," as used herein, does not necessarily refer to the same embodiment, although it may.

Referring to FIG. 1, an earth reduction system 10 generally comprises a water reservoir tank 12 that defines an interior volume that holds water therein, a collection tank 14, a motor 16, a drilling apparatus 18, and back fill reservoirs 20 and 22, all mounted on a mobile chassis 24, which, in an embodiment shown, is in the form of a trailer. Trailer 24 includes four wheels 38 (only three of which are shown in FIG. 1) and a draw bar and hitch 40. Earth reduction system 10 generally mounts on a platform 42, which is part of trailer 24. It should be understood that while drill and backfill system 10 is illustrated mounted on a trailer having a platform, the system may also be mounted on the chassis of a vehicle such as a truck or car. Further, a chassis may comprise any frame, platform or bed to which the system components may be mounted and that can be moved by a motorized vehicle such as a car, truck, or skid steer. It should be understood that the components of the system may be either directly mounted to the chassis or indirectly mounted to the chassis through connections with other system components.

Figure 2:
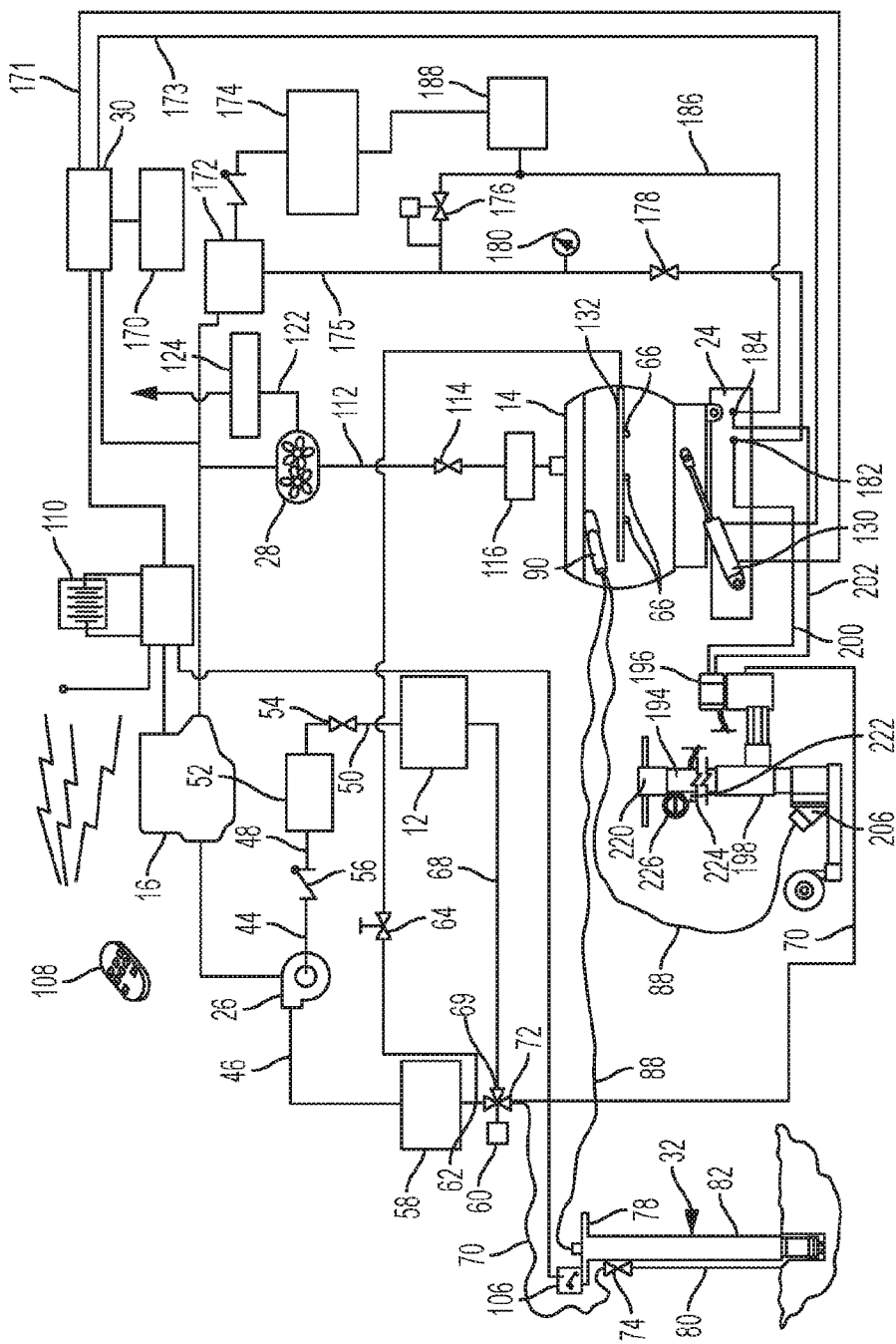
FIG. 2 is a schematic view of the prior art hydraulic, electric, water, and vacuum systems of the drilling and backfill earth reduction system of FIG. 1.

The connection of the various components of system 10 is best illustrated in FIG. 2.

Referring also to FIG. 1, motor 16 mounted on a forward end of trailer 24 provides electricity that powers two electric hydraulic pumps 30 and 172 (FIG. 2) and drives both a water pump 26 (FIG. 2) and a vacuum pump 28 (FIG. 2) by belts (not shown). Motor 16 is preferably a gas or diesel engine, although it should be understood that an electric motor or other motive means could also be used. In one preferred embodiment, motor 16 is a thirty horsepower diesel engine, such as Model No. V 1505 manufactured by Kubota Engine division of Japan, or a twenty-five horsepower gasoline engine such as Model Command PRO CH25S manufactured by Kohler Engines. The speed of motor 16 may be varied between high and low by a wireless keypad transmitter 108 (FIG. 2) that transmits motor speed control to a receiver 110 (FIG. 2) connected to the throttle of motor 16 (FIG. 2).

A prior art water system is described with reference to FIG. 2. Water reservoir tank 12 connects to water pump 26, which includes a low pressure inlet 44 and a high pressure outlet 46. In the illustrated embodiment, water pump 26 can be any of a variety of suitable pumps that delivers between 3,000 and 4,000 lbs/in2 at a flow rate of approximately five gallons per minute. In one preferred embodiment, water pump 26 is a Model No. TS2021 pump manufactured by General Pump (GP Companies, Inc.) of Mendota Heights, Minn. Water tank 12 includes an outlet 50 that connects to a strainer 52 through a valve 54. The output of strainer 52 connects to the low pressure side of water pump 26 via a hose 48. A check valve 56 is disposed inline intermediate strainer 52 and low pressure inlet 44. High pressure outlet 46 connects to a filter 58 and then to a pressure relief and bypass valve 60. In one embodiment, pressure relief and bypass valve 60 is a Model YUZ 140 valve manufactured by General Pump.

A "T" 62 and a valve 64, located intermediate valve 60 and filter 58, connect the high pressure output 46 to a plurality of clean out nozzles 66 mounted in collection tank 14 to clean the tank's interior. A return line 68 connects a low pressure port 69 of valve 60 to water tank 12. When a predetermined water pressure is exceeded in valve 60, water is diverted through low port 69 and line 68 to tank 12. A hose 70, stored on a hose reel 73 (FIG. 1), connects an output port 72 of valve 60 to a valve 74 on a digging tool 32. Digging tool 32 may also include a control 106 for controlling the tool's vacuum feature. Control 106 may be an electrical switch, a vacuum or pneumatic switch, a wireless switch, or any other suitable control to adjust the vacuum action by allowing the vacuum to be shut off or otherwise modulated. An antifreeze system, generally 190 (FIG. 1), may be provided to prevent freezing of the water pump and the water system. Thus, when the pump is to be left unused in cold weather, water pump 26 may draw antifreeze from the antifreeze reservoir through the components of the water system to prevent water in the hoses from freezing and damaging the system. A valve control 76 (not shown) at a handle 78 of digging tool 32 provides the operator with a means to selectively actuate valve 74 on digging tool 32. The valve delivers a high pressure stream of water through a conduit 80 attached to the exterior of an elongated pipe 82 that extends the length of digging tool 32.

Similar to the previous embodiment, a water feed line (not shown) may be attached to the length of the elongated pipe that terminates in a fluid manifold (not shown). Nozzles (not shown), similar to that in the previous embodiment, may be in fluid communication with the water manifold for use in cutting and breaking up of the digging material. The water feed line may be formed integrally with the elongated pipe, or a separate feed line may be attached to the pipe using clamps, adhesive, fasteners, etc.

Referring to FIGS. 1 and 2, vacuum pump 28 is preferably a positive displacement type vacuum pump such as that used as a supercharger on diesel truck. In one preferred embodiment, vacuum pump 28 is a Model 4009-46R3 blower manufactured by Tuthill Corporation, Burr Ridge, Ill. A hose 112 connects an intake of the vacuum pump to a vacuum relief device 114, which may be any suitable vacuum valve, such as a Model 215V-H01AQE spring loaded valve manufactured by Kunkle Valve Division, Black Mountain, N.C. Vacuum relief device 114 controls the maximum negative pressure of the vacuum pulled by pump 28, which is in the range of between 10 and 15 inches of Mercury (Hg) in the illustrated embodiment. A filter 116 (FIG. 1), located upstream of pressure relief valve 114, filters the vacuum air stream before it passes through vacuum pump 28. In one preferred embodiment, the filter media may be a paper filter such as those FleetGuard filters manufactured by Cummins Filtration (Cummins, Inc.) of Nashville, Tenn. and Columbus, Ind. Filter 116 connects to an exhaust outlet 118 of collection tank 14 by a hose 120, as shown in FIGS. 1 and 2. An exhaust side 122 of vacuum pump 28 connects to a silencer 124, such as a Model TS30TR cowl silencer manufactured by Phillips & Temro Industries of Eden Prairie, Minn. The output of silencer 124 exits into the atmosphere.

The vacuum air stream pulled through vacuum pump 28 produces a vacuum in collection tank 14 that draws a vacuum air stream through collection tank inlet 90. When inlet 90 is not closed off by a plug 127 (FIG. 1), the inlet may be connected to hose 88 leading to digging tool 32.

Referring again to FIG. 1, backfill reservoirs 20 and 22 are mounted on opposite sides of collection tank 14. The back fill reservoirs are mirror images of each other; therefore, for purposes of the following discussion, reference will only be made to backfill reservoir 22. It should be understood that backfill reservoir 20 is configured and operates identically to that of reservoir 22. Similar components on backfill reservoir 20 are labeled with the same reference numerals as those on reservoir 22.

Back fill reservoir 22 is generally cylindrical in shape and has a bottom portion 144, a top portion 146, a back wall 148, and a front wall 150. Top portion 146 connects to bottom portion 144 by a hinge 152. Hinge 152 allows backfill reservoir 22 to be opened and loaded with dirt by a front loader 154, as shown in phantom in FIG. 1. Top portion 146 secures to bottom portion 144 by a plurality of locking mechanisms 156 located on the front and back walls. Locking mechanisms 156 may be clasps, latches or other suitable devices that secure the top portion to the bottom portion. The seam between the top and bottom portion does not necessarily need to be a vacuum tight seal, but the seal should prevent backfill and large amounts of air from leaking from or into the reservoir. Front wall 150 has a hinged door 158 that is secured close by a latch 160. Hydraulic cylinders (not shown) can enable the back fill reservoirs to tilt so that dirt can be off loaded through doors 158.

As previously described above, backfill reservoirs 20 and 22 may be filled by opening top portions 146 of the reservoirs and depositing dirt into bottom portion 144 with a front loader. Vacuum pump 28, however, may also load dirt into back fill reservoirs 20 and 22. In particular, back fill reservoir 22 has an inlet port 162 and an outlet port 164. During normal operation, plugs 166 and 168 fit on respective ports 162 and 164 to prevent backfill material from leaking from the reservoir. However, these plugs may be removed, and outlet port 164 may be connected to inlet port 90 on collection tank 14 by a hose (not shown), while hose 88 may be attached to inlet port 162. In this configuration, vacuum pump 28 pulls a vacuum air stream through collection tank 14, as described above, through the hose connecting inlet port 90 to outlet port 164, and through hose 88 connected to inlet port 162. Thus, backfill dirt and rocks can be vacuumed into reservoirs 20 and 22 without the aide of loader 154. It should be understood that this configuration is beneficial when backfill system 10 is being used in an area where no loader is available to fill the reservoirs. Once the reservoirs are filled, the hoses are removed from the ports, and plugs 166 and 168 are reinstalled on respective ports 162 and 164.

Referring again to FIG. 2, hydraulic cylinders 130, used to tilt collection tank 14 and backfill reservoirs 20 and 22, are powered by electric hydraulic pump 30. Hydraulic pump 30 connects to a hydraulic reservoir 170 and is driven by the electrical system of motor 16. A high pressure output line 171 and a return line 173 connect pump 30 to hydraulic cylinders 130. Hydraulic pump 172, mounted on trailer 24, is separately driven by motor 16 and includes its own hydraulic reservoir 174. An output high pressure line 175 and a return line 186 connect pump 172 to a pair of quick disconnect couplings 182 and 184, respectively. That is, high pressure line 175 connects to quick disconnect coupling 182 (FIGS. 1 and 2) through a control valve 178, and return line 186 connects quick disconnect coupling 184 to reservoir 188. A pressure relief valve 176 connects high pressure line 175 to reservoir 188 and allows fluid to bleed off of the high pressure line if the pressure exceeds a predetermined level. A pressure gauge 180 may also be located between pump 172 and control valve 178.

Quick disconnect coupling 182 provides a high pressure source of hydraulic fluid for powering auxiliary tools, such as drilling apparatus 18, tamper device (not shown) or other devices that may be used in connection with drilling and backfill system 10. The high pressure line preferably delivers between 5.8 and 6 gallons per minute of hydraulic fluid at a pressure of 2000 lbs/in. Hydraulic return line 186 connects to a quick disconnect coupling 184 (FIGS. 1 and 2) on trailer 24. Intermediate quick disconnect coupling 184 and hydraulic fluid reservoir 174 is a filter 188 that filters the hydraulic fluid before returning it to hydraulic reservoir 174. While quick disconnect couplings 182 and 184 are shown on the side of trailer 24, it should be understood that the couplings may also be mounted on the rear of trailer 24.

Referring to FIGS. 1 and 2, drilling apparatus 18 is carried on trailer 24 and is positioned using winch and crane 36. Drilling apparatus 18 includes a base (not shown), a vertical body 194, and a hydraulic drill motor 196 slidably coupled to vertical body 194 by a bracket 198. A high pressure hose 200 and a return hose 202 power motor 196. A saw blade (not shown) attaches to an output shaft of hydraulic motor 196 and is used to drill a coupon 206 in pavement, concrete or other hard surfaces to expose the ground above the buried utility. The term "coupon" as used herein refers to a shaped material cut from a continuous surface to expose the ground beneath the material. For example, coupon 206 may be a circular piece of concrete that is cut out of a sidewalk to expose the ground thereunder.

Body 194 has a handle 220 for the user to grab and hold onto during the drilling process. Hydraulic fluid hoses 200 and 202 connect to two connectors 222 and 224 (FIG. 2) mounted on body 194 and provide hydraulic fluid to hydraulic drill motor 196. A crank 226 is used to move the drill motor vertically along body 194. Drilling apparatus 18 is a Model CD616 Hydra Core Drill manufactured by Reimann & Georger of Buffalo, N.Y. and is referred to herein as a "core drill."

In operation, the location of a hole is determined, and if drill apparatus 18 (FIG. 2) was used to remove a coupon from the site, the user disconnects vacuum hose 88 from the drill and connects the hose to digging tool handle 78 using a banjo connector (not shown). High pressure water hose 70 is also connected to valve 74 to provide water to the digging tool as deemed necessary. As tool 32 is used to dig a hole, it is pressed downwardly into the ground. For larger diameter holes, digging tool 32 is moved in a generally circular manner as it is pressed downward, thereby removing material from a large cross-section area. Slurry formed in the hole is vacuumed by tool 32 through a vacuum passage (not shown) and accumulates in collection tank 26. Once the hole is completed and the utility exposed, the vacuum system can be shut down, and the operators may examine or repair the utility as needed.

Referring again to FIG. 1, collection tank 14 includes a discharge door 126 connected to the main tank body by a hinge 128 that allows the door to swing open, thereby providing access to the tank's interior for cleaning. A pair of hydraulic cylinders 130 (not shown) is provided for tilting a forward end 132 of tank 14 upwards in order to cause the contents to run towards discharge door 126. Discharge door 126 includes a sight glass 136 to allow the user to visually inspect the tank's interior. Discharge door 126 also has a screw-down type handle 134 mounted in the door. A gate valve 140, coupled to a drain 142 in discharge door 126, drains the liquid portion of the slurry in tank 14 without requiring the door to be opened. Gate valve 140 may also be used to introduce air into collection tank 14 to reduce the vacuum in the tank so that the door may be opened.

Figure 3:
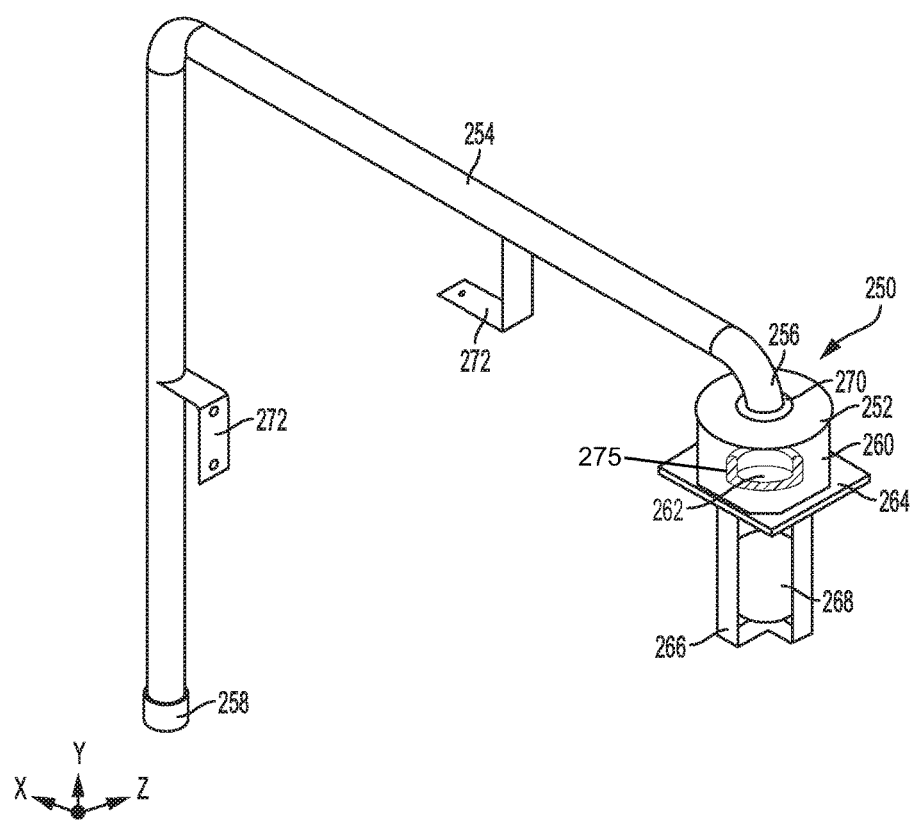
FIG. 3 is a perspective view of a fill device for a water reservoir tank in accordance with an embodiment of the present invention.
Figure 4:
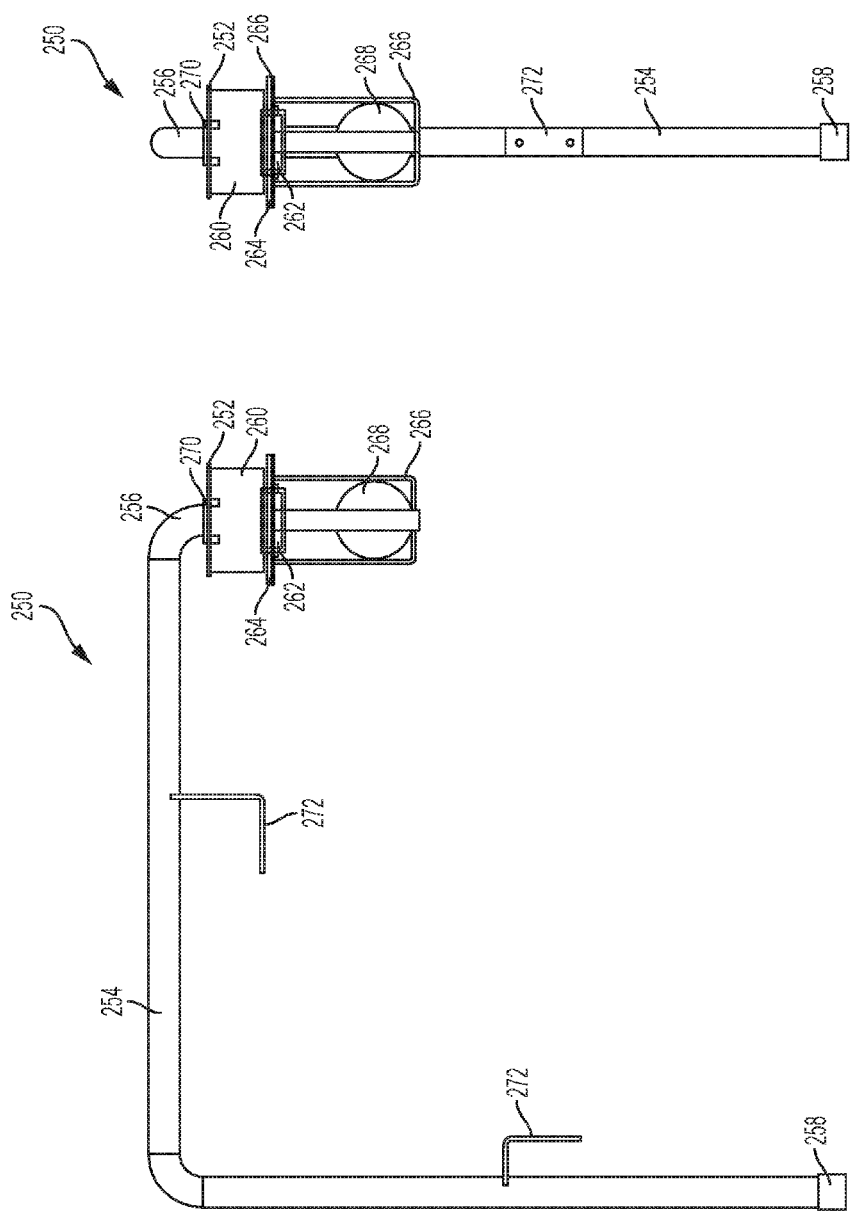
FIG. 4A is a side view of a fill device for a water reservoir tank in accordance with an embodiment of the present invention.
FIG. 4B is a front view of a fill device for a water reservoir tank in accordance with an embodiment of the present invention.

FIG. 3 provides a perspective view of a fill device 250 in accordance with an embodiment of the present invention. Fill device 250 is suitable for use with a water reservoir tank 12 (FIG. 1) and generally comprises a center ring 252 having a top surface and a bottom surface, a pipe 254 having a first end 256 connected to the top surface of center ring 252 and a second end 258 for connection to a water supply (not shown), a circular skirt 260 affixed to the bottom surface of center ring 252 and extending downward from the ring toward the tank, an opening 262 surrounded by a plate 264 that, together with skirt 260 and a rim 275 surrounding opening 262, defines a tortuous path between opening 262 and the environment ambient to fill device 250 and that is positioned below the first end 256 of the pipe 254 and the circular skirt 260, and a check valve support 266 with a check valve 268 mounted below opening 262 and plate 264. In certain embodiments, ring 252 has a circular perimeter, but it should be understood that this is for purposes of example only and that the ring could also have a non-circular, e.g. polygonal, perimeter shape. Similarly, skirt 260 may have a circular or non-circular perimeter shape. Further, the skirt is, in certain embodiments, made of aluminum sheet, carbon steel, or other material that is non-porous to water and debris particles above at least a desired dimension. It should be understood, however, that the skirt may be made of other materials, e.g. meshes, that provide flexibility but yet have sufficiently small interstices that block the passage of water and debris therethrough to a sufficient, desired degree. Further, in other embodiments, ring 252 is omitted, and skirt 260 depends directly from pipe end 256. In such embodiments, the distinction between the pipe and the skirt may not be precisely defined, and the two components may be formed as a unitary construction.

Fill device 250 may further comprise a seal 270 around first end 256 of pipe 254. The seal may be circular (as shown) or of another shape. The seal sits on top of center ring 252. The seal may be made of any number of materials including, but not limited to, elastomer or other polymer, metal, or foam. The fill device comprises at least one pipe mounting bracket 272 attached to pipe 254.

Skirt 260 encompasses an internal area, the perimeter of which projects downward to surround opening 262. In the presently illustrated embodiment, the skirt extends from ring 252 but does not reach the surface of water tank 12, leaving a gap between the entirety of the skirt's bottom edge and the top of tank 12. In other embodiments, however, some or all of the skirt may reach, and possibly attach to, the surface of tank 12 at or outward of hole 262. In such embodiments, holes may be provided in the skirt so that there is not a sealed engagement between the water pipe and the hole when a water hose is attached to the pipe's opposite end, such holes comprising a "gap" as that term is used herein provided the one or more holes are sufficient to preclude backpressure in view of the water flow rates and pressures involved in a given configuration. That is, the gap precludes backpressure in the water pipe when water flows from the pipe, through the skirt and into the tank through the opening at an expected water pressure, for example such pressure supplied by a municipal water source, as affected by the components between that water source and the skirt. In these various embodiments, a periphery of the skirt surrounds the opening, regardless whether the skirt reaches or stops short of the tank surface, which in the illustrated embodiments may be considered to include plate 264.

The path between the environment or area external to the skirt (and the skirt's internal area) and opening 262 is tortuous in that it precludes a straight path from the ambient environment to the opening. This means, for example, that debris exterior of fill device 250 must, to reach opening 262, travel over the lip of plate 264, then change direction to get under the bottom edge of skirt 260, and then change direction again to get over rim 275. Other tortuous paths may be defined, for example, including holes in skirt 260 that define the backpressure gap. Accordingly, while debris is not entirely precluded from reaching opening 262 from ambient, the tortuous path materially reduces that likelihood.

In fill device 250 of FIG. 3, a gap or space 273 is present between the bottom of skirt 260 and plate 264. Gap 273 establishes a separation between end 256 of pipe 254 (which is, in operation during tank filling, connected in a fluid tight attachment to a pressurized public water source) and opening 262 to meet municipal requirements to avoid back pressure in municipal water lines.

The elevation of rim 275 inhibits water from escaping hole 262 to some degree more so than an even-elevation about hole 262 would. Moreover, however, check valve 268 (discussed below) includes a stainless steel float ball that floats upward with water in the tank, closing hole 262 and generally preventing water from flowing out of the hole and thereby out of the tank. Accordingly, the tank and trailer 24 may be used and moved, for example by transport over roads, without a cap closing off hole 262 and so that, when the check valve float ball is not obstructing hole 262, hole 262 provides a fluid path from the tank's interior to the tank's exterior during use and transport. Check valve 268 and, to some extent rim 275 in certain embodiments, nonetheless inhibit water flow out of the tank through hole 262.

In an embodiment of the present invention as shown in FIG. 3, check valve 268 is a ball check valve. Check valve 268 has a spherical ball float made of, for example, stainless steel that floats in water. The valve is disposed within the interior volume of water tank 12 and adjacent opening 262 so that when water moves within the tank's interior volume toward hole 262, the ball float moves with the water toward opening 262. The ball float's diameter is at least as large, or larger, than the diameter of opening 262 (or, where the ball float and opening have non-circular cross sections, the ball float cross section otherwise encompasses the opening's cross section) so that when the water moves the ball float to opening 262, the ball float closes the opening under the water's force and thereby inhibits the water's escape. In such embodiment, the check valve is normally open but can be biased by the water to close the opening when the tank water moves toward the opening.

In other embodiments, the check valve can take other forms. For example, the check valve may be a spring loaded check valve, where the spring biases the check valve to a closed position, thereby normally closing opening 262. The spring strength is selected so that the check valve remains closed against pressure up to the expected pressure of water issuing from end 256 of pipe 254. Thus, the check valve maintains opening 262 closed until an operator connects pipe 254 to a pressurized water source, such as a municipal mains water supply, and pressurized water from pipe end 256 impacts the check valve surface. The water pressure then opens the check valve against the spring bias and allows water to flow from the pipe, through the valve, and into the tank. In such embodiments, the spring bias, though calibrated to open against the expected force of the flowing water, does not open against the weight of debris that may be expected to reach or impact the valve at the opening during the system's expected use. In such embodiments, water in the tank's interior volume, when moving to opening 262, also biases the check valve in a closed position with respect to opening 262. When no water flows from the pipe, through the skirt to the opening, this bias does not result in the check valve's movement because the check valve is normally closed, but such flow and resulting bias could move the check valve to the closed position from an open position when water is flowing from the pipe, through the skirt and to the opening during the tank's filling.

In an aspect of the present invention, opening 262 to the water reservoir tank is threaded. Thus, opening 262 may be threadedly connected to a water source pipe, e.g. a pressurized or non-pressurized water source not connected to a public water supply, if desired.

As shown in FIG. 3, pipe 254 extends in a horizontal direction such that it may run or extend along the top of water reservoir tank 12. The pipe also bends and extends in a vertical direction such that it can extend or run along at least one side of water reservoir tank 12. Water reservoir tank 12 can be of any shape but typically is rectangular in cross-section in a vertical plane that includes the tank's longitudinal axis (and, e.g. is circular in cross-section in a vertical plane perpendicular to the tank's longitudinal axis). Thus, it is within the scope of the present invention that pipe 254 can be configured in any number of directions and dimensions in order, for example, to accommodate the shape of water reservoir tank 12.

FIG. 4A is a side view of fill device 250 for use with a water reservoir tank 12 in accordance with an embodiment of the present invention. FIG. 4B is a front view of a fill device 250 for a water reservoir tank 12 in accordance with an embodiment of the present invention. As shown in each of FIGS. 4A and 4B, fill device 250 comprises a seal 270, center ring 252, a pipe 254 having a first end 256 connected to the top surface of center ring 252 and a second end 258 for connection to a water supply (not shown), at least one pipe mounting bracket 272 for mounting to water reservoir tank 12, a circular skirt 260 affixed to the bottom surface of center ring 252, and an opening 262 (shown in dotted lines) surrounded by a plate 264 that, with skirt 260 and rim 275, defines a tortuous path between the ambient environment and the opening, as discussed above. Plate 264 is positioned below first end 264 of the pipe and circular skirt 260. As shown in FIGS. 4A and 4B, check valve support 266 with check valve 268 is mounted below opening 262 and plate 264. Gap 273 between the bottom of skirt 260 and plate 264 is visible in FIGS. 4A and 4B.

Figure 5:
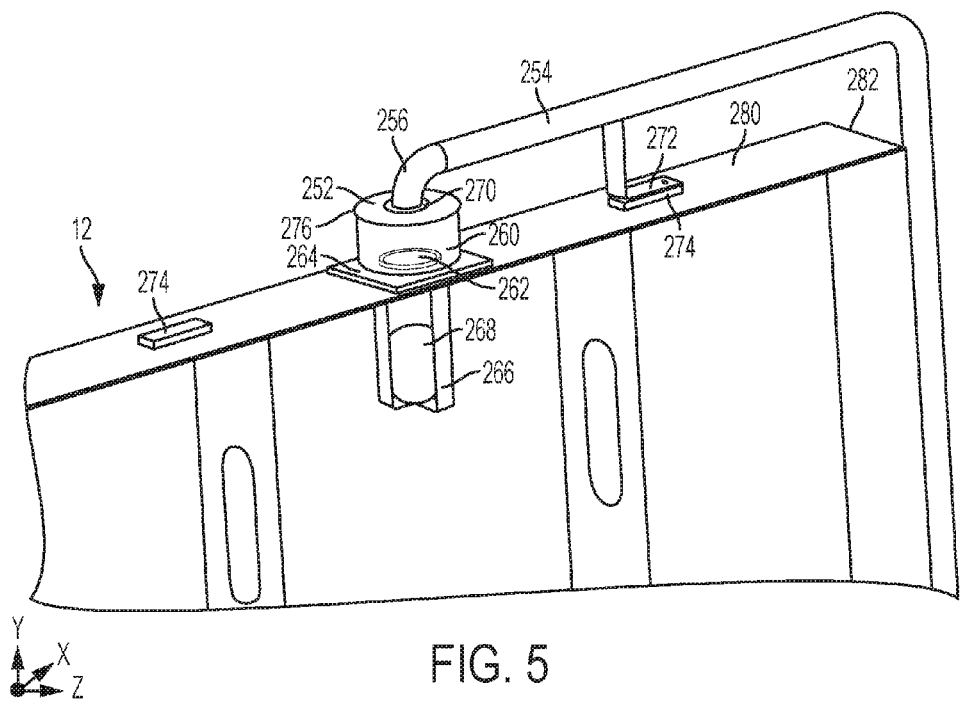
FIG. 5 is a perspective internal view of a water reservoir tank having a fill device in accordance with an embodiment of the present invention.

FIG. 5 is a perspective internal view of a water reservoir tank 12 having a fill device 250 in accordance with an embodiment of the present invention. As shown in FIG. 5, water reservoir tank 12 has a top 280 and at least one side 282 and a fill device 250 (FIG. 3) mounted thereto. The fill device comprises center ring 252 having a top surface and a bottom surface, seal 270, pipe 254 having a first end 256 connected to the top surface of center ring 252 and a second end (not shown) for connection to a water supply, circular skirt 260 affixed to the bottom surface of center ring 252, an opening 262 in water reservoir tank 12 surrounded by a plate 264 that, with skirt 260 and rim 275, defines a tortuous path between the opening 262 and the ambient area and that is positioned below first end 256 of pipe 254 and circular skirt 260, and a check valve support 266 with a check valve 268 mounted in water reservoir tank 12 and below opening 262 and plate 264. Center ring 252 may have a lip or edge 276. As seen in FIG. 5, there may be one or more supports 274 affixed to water reservoir tank 12 for attachment to mounting bracket 272.

Figure 6:
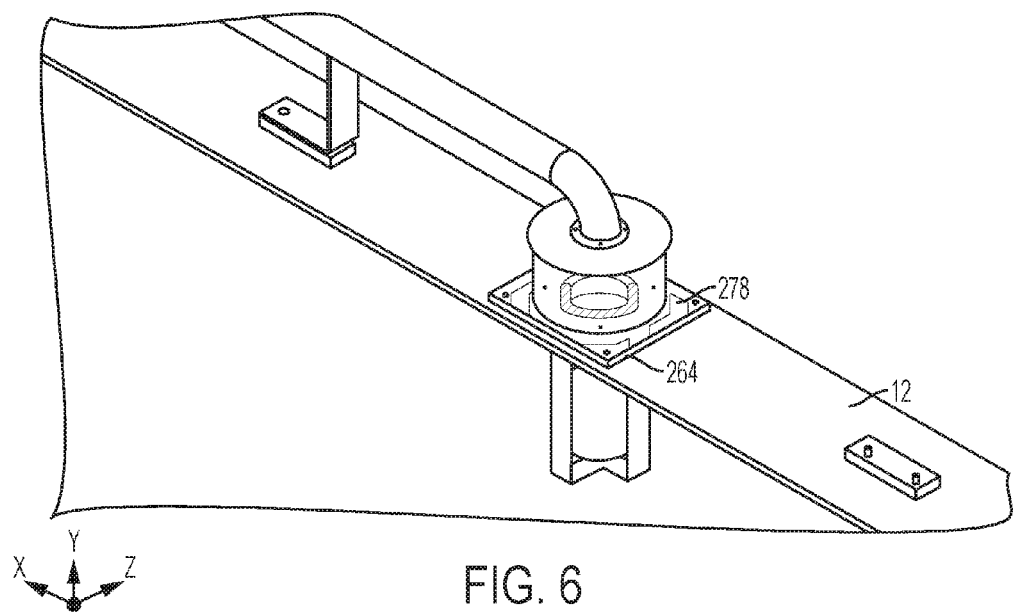
FIG. 6 is another perspective internal view of a water reservoir tank having a fill device in accordance with an embodiment of the present invention.

FIG. 6 is another perspective internal view of a water reservoir tank having a fill device in accordance with an embodiment of the present invention. FIG. 6 more clearly illustrates tortuous path 278 of plate 264. Although shown as a square plate in the embodiment of FIG. 6, plate 264 may be of any shape. Tortuous path 278 itself may be of varying configuration. Among the purposes of such plate is to assist with keeping water inside the tank but keeping contaminants and inlet debris out of the tank.

Figure 7:
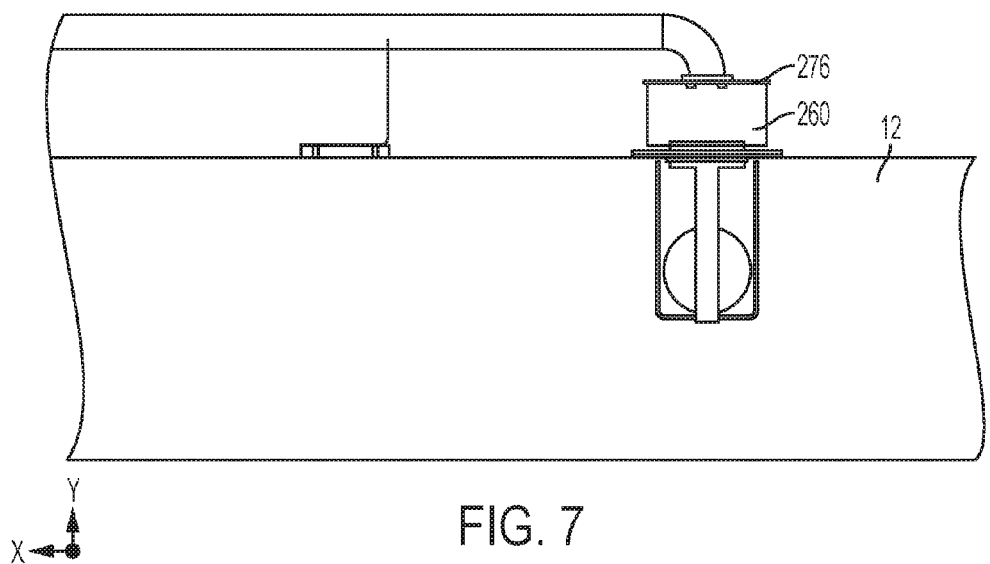
FIG. 7 is a side internal view of a water reservoir tank having a fill device in accordance with an embodiment of the present invention.

FIG. 7 is a side internal view of a water reservoir tank having a fill device in accordance with an embodiment of the present invention. FIG. 7 illustrates that lip 276 of center ring 252 may extend beyond the outer diameter of skirt 260.

It should be appreciated by those skilled in the art that various modifications and variations can be made in the present invention without departing from the scope and spirit of the invention. It is intended that the present invention cover such modifications and variations as come within the scope and spirit of the appended claims and their equivalents.

What is claimed is:

1. A fill device and water reservoir tank in an earth reduction system, comprising:
    a water tank having an opening at an upper surface thereof and defining an interior volume;
    a pipe having a first end offset from the opening and a second end for connection to a water supply;
    a skirt affixed to the first end of the pipe and extending downward therefrom toward the opening and having a periphery that surrounds the opening and that defines a gap disposed between the first end and the opening so that the gap inhibits water flow out of the tank and into the pipe; and
    a check valve mounted within the water tank interior volume adjacent the opening so that water flow from the interior volume of the water tank toward the opening biases the check valve in a closed position with respect to the opening.

2. The fill device and water reservoir tank as in claim 1, wherein the gap is defined between a bottom edge of the skirt and an upper surface of the water tank.

3. The fill device and water reservoir tank as in claim 2, comprising a rim on the upper surface of the water tank about the opening and within the periphery.

4. The fill device and water reservoir tank as in claim 1, wherein the check valve is a ball float check valve.

5. The fill device and water reservoir tank as in claim 1, wherein the check valve is biased to a position of the check valve that closes the opening in absence of a force opposing the bias.

6. A fill device for a water reservoir tank in an earth reduction system, comprising:
    a ring having a top surface and a bottom surface;
    a pipe having a first end connected to the top surface of the ring and a second end for connection to a water supply;
    a skirt affixed to the bottom surface of the ring and extending downward therefrom, away from the first end, the skirt encompassing an internal area;
    an opening surrounded by a plate that defines, in conjunction with the skirt, a tortuous path between the opening and an area that is external to the skirt with respect to the internal area, the plate being positioned below the first end of the pipe and the skirt; and
    a check valve support with a check valve mounted below the opening and the plate.

7. The fill device according to claim 6, further comprising a seal around the first end of the pipe.

8. The fill device according to claim 7, wherein the seal is on the top surface of the ring.

9. The fill device according to claim 6, wherein a gap is present between the skirt and the plate.

10. The fill device according to claim 6, wherein the check valve is a ball float check valve.

11. The fill device according to claim 6, wherein the check valve is a spring loaded check valve.

12. The fill device according to claim 11, wherein the check valve is biased to a position of the check valve that closes the opening in absence of a force opposing the bias.

13. The fill device according to claim 6, further comprising at least one pipe mounting bracket attached to the pipe.

14. The fill device according to claim 6, wherein the opening to the water reservoir tank is a threaded opening.

15. The fill device according to claim 6, wherein the pipe extends in a horizontal direction.

16. The fill device according to claim 6, wherein the pipe extends in a vertical direction.

17. An earth reduction system, comprising:
    a water tank having a top and at least one side; and
    a fill device at the top of the water tank, the fill device comprising
        a ring having a top surface and a bottom surface,
        a pipe having a first end connected to the top surface of the ring and a second end for connection to a water supply,
        a skirt affixed to the bottom surface of the ring and extending downward therefrom, toward the water tank, the skirt encompassing an internal area,
        an opening in the water tank surrounded by a plate that defines, in conjunction with the skirt, a tortuous path between the opening and an area external to the skirt with respect to the internal area, the plate being positioned below the first end of the pipe and the skirt, and
        a check valve support with a check valve mounted in the water tank and below the opening and the plate.

18. The system according to claim 17, further comprising a seal around the first end of the pipe.

19. The system according to claim 18, wherein the seal is on the top surface of the ring.

20. The system according to claim 17, wherein a gap is present between the skirt and the plate.

21. The system according to claim 17, wherein the check valve is a ball float check valve.

22. The system according to claim 17, wherein the check valve is a spring loaded check valve.

23. The system according to claim 22, wherein the check valve is biased to a position of the check valve that closes the opening in absence of a force opposing the bias.

24. The system according to claim 17, further comprising at least one pipe mounting bracket attached to the pipe.

25. The system according to claim 17, wherein the opening in the water tank is a threaded opening.

26. The system according to claim 17, wherein the pipe extends in a horizontal direction along the top of the water tank.

27. The system according to claim 17, wherein the pipe extends in a vertical direction along the at least one side of the water tank.

28. The fill device according to claim 6, wherein the opening comprises a surrounding rim that extends above a lower end of the skirt opposite the first end of the pipe, so that the rim and the lower end of the skirt defines the tortuous path between the area and the opening.

29. The system according to claim 17, wherein the opening comprises a surrounding rim that extends above a lower end of the skirt opposite the first end of the pipe, so that the rim and the lower end of the skirt defines the tortuous path between the area and the opening.

\* \* \* \* \*